United States Patent [19]
Koshy

[11] Patent Number: 5,688,444
[45] Date of Patent: Nov. 18, 1997

[54] TOWER PACKING ELEMENT

[75] Inventor: T. Daniel Koshy, Hudson, Ohio

[73] Assignee: Norton Chemcial Process Products Corporation, Stow, Ohio

[21] Appl. No.: 681,652

[22] Filed: Jul. 29, 1996

[51] Int. Cl.$^6$ .................................................. B01F 3/04
[52] U.S. Cl. ............................. 261/94; 261/DIG. 72
[58] Field of Search ..................... 261/DIG. 72, 94, 261/98

[56]            References Cited

U.S. PATENT DOCUMENTS

| | | | |
|---|---|---|---|
| 1,173,187 | 2/1916 | Hechenbleikner | 261/DIG. 72 |
| 1,307,635 | 6/1919 | Nielsen | 261/DIG. 72 |
| 2,055,162 | 9/1936 | Weber | 261/94 |
| 2,172,714 | 9/1939 | Schack et al. | 261/DIG. 72 |
| 4,303,599 | 12/1981 | Strigle, Jr. et al. | 261/98 |
| 4,316,863 | 2/1982 | Leva | 261/DIG. 72 |
| 4,333,892 | 6/1982 | Ellis et al. | 261/94 |
| 4,490,312 | 12/1984 | Furr | 261/98 |
| 4,576,763 | 3/1986 | Nutter | 261/94 |
| 4,716,066 | 12/1987 | Wymann et al. | 261/DIG. 72 |
| 5,112,536 | 5/1992 | McNulty et al. | 261/94 |
| 5,200,119 | 4/1993 | Leva | 261/94 |
| 5,304,423 | 4/1994 | Niknafs et al. | 261/94 |
| 5,543,088 | 8/1996 | Halbirt | 261/94 |

FOREIGN PATENT DOCUMENTS

| | | | |
|---|---|---|---|
| 678331 | 10/1995 | European Pat. Off. | B01J 35/02 |
| 2121702 | 1/1984 | United Kingdom | 261/DIG. 72 |

*Primary Examiner*—Tim R. Miles
*Attorney, Agent, or Firm*—David Bennett

[57]            ABSTRACT

Tower packing element comprising a tubular body member with an essentially triangular cross-section and having projections within the element extending from the inside surface of the body member, is provided. The axial length of the tubular body member is smaller than the width as measured from an apex of the triangle to the nearest point on the opposed side.

5 Claims, 4 Drawing Sheets

TOWER PACKING ELEMENT

BACKGROUND OF THE INVENTION

The present invention relates to certain kinds of tower packing elements such as are used in mass transfer and heat transfer applications in chemical processes. Such elements, which are often referred to as random dumped packings, are designed to give a large surface area for contact of gases with liquids while resulting in as low a gas phase pressure drop within the tower as possible. The elements are typically dumped into a vertical tower and piled to a considerable depth. There is therefore a tendency for the elements at the bottom to become deformed or flattened thus affording an increased resistance to flow through the tower and an undesirable pressure gradient within the tower.

It is also important that the elements do not nest together since this would produce localized regions of non-uniform pressure and, if widespread, could cause significant, non-uniform pressure drop through the tower and non-uniform performance.

Tower packing elements are therefore normally designed to provide structures that resist a preferred orientation in the tower and deformation under the pressures encountered in use within the tower while still affording an open structure and a large surface area.

Typical structures of the type referred to above are known as Pall rings and Raschig rings. As the names imply these are cylindrical in structure and are provided with various kinds of internal projections to increase the surface area. Such structures are resistant to crushing but do give rise to undesirable pressure drops in some applications. For such uses more open structures such as those described in U.S. Pat. Nos. 4,303,599; 4,333,892; and 4,576,763 are preferred. These are basically arcuate metal sheet structures with one or more strip elements cut from the metal of the arc and bowed inward within the arc so as to adopt a curvature opposite to that of the arc and form a bridge between the open ends of the arc. These bridging loops are primarily intended to define additional liquid passages and surfaces and to resist the tendency of the elements to "nest" together. The structures have been made with increasing complexity with a view to reducing weight while not compromising resistance to compression.

It has now been discovered that packing elements that adopt a preferred orientation when placed in a tower can be very effective providing they have a configuration which leads to the adoption of a relatively uniform packing density. Such a configuration has now been discovered. The elements of the invention tend to fall into a tower with a preferred orientation and to pack in such a way that an ordered density of elements is secured without giving rise to a significant pressure drop. Because of the internal structure of the elements there is a large surface area over which liquid/vapor contact can take place. This internal structure also tends to prevent nesting in the event the preferred orientation is disturbed and a more random packing within parts of the tower results.

SUMMARY OF THE INVENTION

The invention comprises a random dumped packing element having a peripheral body member in the general shape of an equilateral triangle having width and depth dimensions, measured from an apex to the nearest point on the opposed base and along the axis of the element respectively, wherein the width is greater than the depth, the space within the peripheral body member being occupied by a plurality of projections from the internal surfaces of the sides of the body member.

The peripheral body member is described as having the general shape of an equilateral triangle and this is intended to include shapes in which the internal angles of the triangle differ from 60° by as much as 5° or even 10°. In addition shapes in which the sides are bowed inwardly or outwardly or the apexes are somewhat rounded are included provided that the general shape is still recognizably that of a triangle. Such departures from the classic equilateral triangle are essentially inevitable consequences of various manufacturing techniques and materials as will become apparent from the precise embodiments discussed below.

The relative proportions of the width and depth are preferably such that the width is at least 1.5 and more preferably 3 times the depth or even more. This improves the chances that, when the element is dumped into a tower with many other similar elements, the preferred orientation adopted will be with the axial dimension essentially vertical.

The projections extending within the body member are preferably in the form of loops connecting adjacent sides of the triangular peripheral body member. These loops are preferably uniformly distributed such that each pair of adjacent sides is connected by at least one and preferably two loops.

DETAILED DESCRIPTION OF THE INVENTION

The peripheral body member has the shape of a tube with axial length representing the depth dimension and the cross-section perpendicular to the axis having the general shape of an equilateral triangle. The tube is preferably provided with flanges along at least a portion of the periphery of the ends. Where the structure is made from a deformable material, such flanges add a degree of rigidity. Such rigidity can be enhanced further by the provision of a rib deformation around the periphery of the tube intermediate the ends thereof. This rib can be deformed to project inside or outside the body member.

It is also possible to provide apertures in the peripheral body member to promote circulation of liquid flowing along the internal or external surface of the peripheral body member to the opposite side of the member.

The projections within the peripheral body member can have the form of individual tongues or loops connecting adjacent sides of the triangular peripheral body member or both. The loop projections, where these are present, are preferably used in pairs of differing size, (one larger and one smaller), connecting pairs of adjacent sides. This ensures that more of the space between the loop and the peripheral body member is occupied by these projections.

Where loop projections are used the space between the loop and the peripheral body member can also be occupied by tongue shaped projections from either the body member or preferably from the loop itself.

The material from which the element is formed can be any suitable material such as metal, (for example stainless steel), plastic or ceramic. Where the material is a metal the loops and/or tongue shaped projections are formed by cutting from the peripheral body member, or loop member if there is one, an appropriate shape and deforming the cut metal from the plane of the part from which it is cut to form the loop or tongue.

Where the material is an extruded shape made of plastic or ceramic the projections are preferably loops and these loops are preferably connected to each other so as to provide an extruded shape with excellent resistance to crushing or deformation.

DRAWINGS

DESCRIPTION OF THE PREFERRED EMBODIMENTS

The invention is now described with reference to the Drawings attached hereto which are understood to describe specific embodiments and are not to be taken as implying any necessary limitations on the essential scope of this invention.

Figure 1:
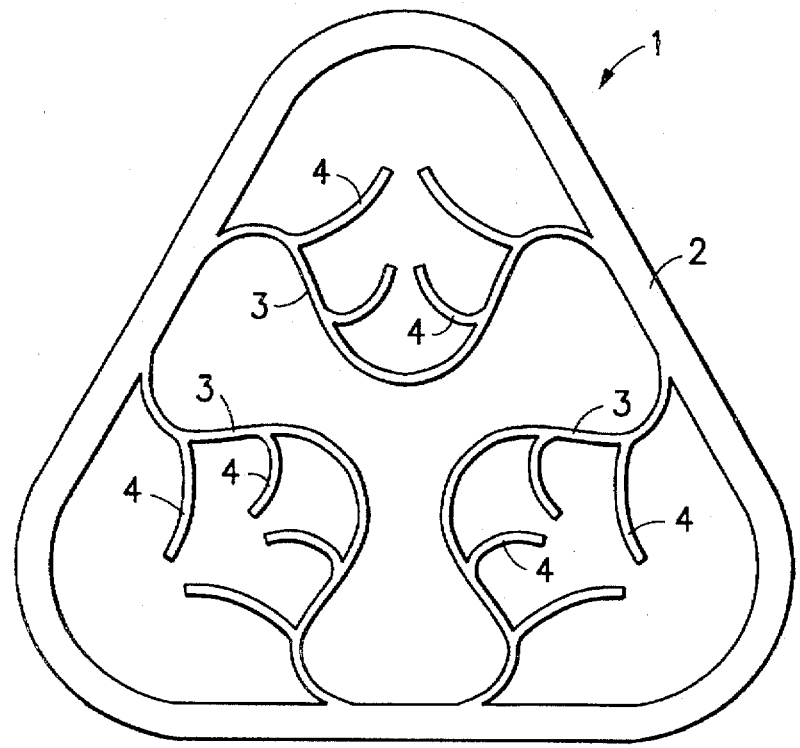
FIG. 1 represents an end view of a first embodiment of an element according to the invention made from metal, the viewpoint being along the axis of the element.

In FIG. 1, shows an end view of an element comprising a generally tubular peripheral body member, 1, having a cross-section along the axis of the tube that is generally that of an equilateral triangle and a cross section at any portion of the body member that is essentially U-shaped as a result of the provision of a flange, 2, at the axial ends of the tube.

The element is made from sheet metal and primary loops, 3, are formed by cutting strips from the peripheral body member and deforming them within the triangular tubular body member so as to connect adjacent sides of the triangle and define a loop space between the loop and one angle of the triangular tubular body member. Two sets of pairs of tongues of metal, 4, are cut from each of the loops and deformed so as to project into the loop spaces.

Figure 2:
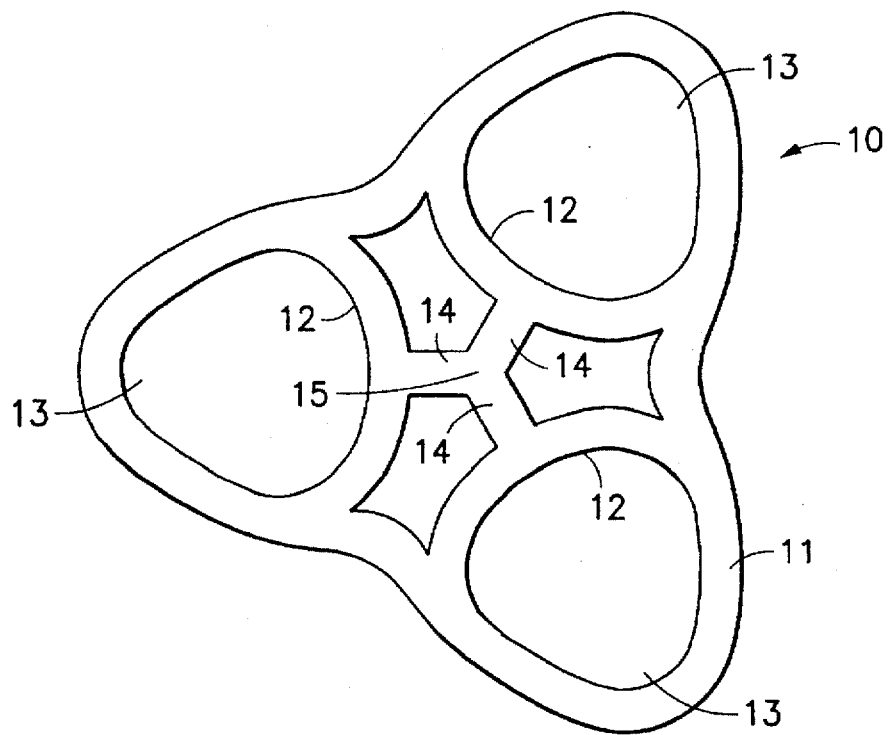
FIG. 2 is an end view of a second embodiment of the invention made by an extrusion process.

FIG. 2 represents a structure that is particularly adapted to the production of elements according to the invention by an extrusion process, for example of a ceramic material.

This drawing presents an end view of an extruded element, 10, comprising a generally triangular tubular body member, 11, with loops, 12, connecting adjacent sides of the triangle and enclosing spaces, 13, between the loop and the body member that provide through passages within the element. The loops are connected by ribs, 14, meeting at a common point, 15.

Figure 3A:
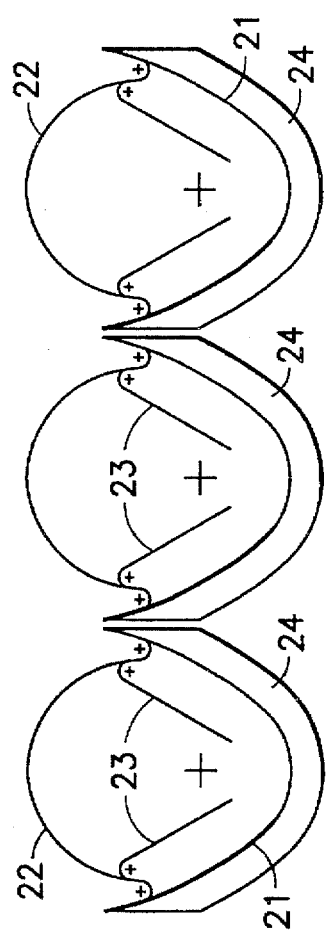
FIG. 3 illustrates an embodiment similar to that shown in FIG. 1. It is presented in two parts 3a and 3b showing how a structure according to the invention can be constructed from three connected individual packing elements (shown in FIG. 3a), when the free ends of the three connected elements are connected together.

FIG. 3 illustrates a method of making the elements of the invention from readily available packing elements of the prior art. FIG. 3a shows end views of three random packing elements laid side by side. Each comprises an arcuate body member, 21, from which loops, 22, have been cut and deformed out of the plane of the body member to define a space between the arcuate body member and the loop into which tongues, 23, cut from the loop are caused to project.

Each arcuate body member is provided with flanges, 24, to give the member a U-shaped cross-section over the greater part of its length.

Figure 3B:
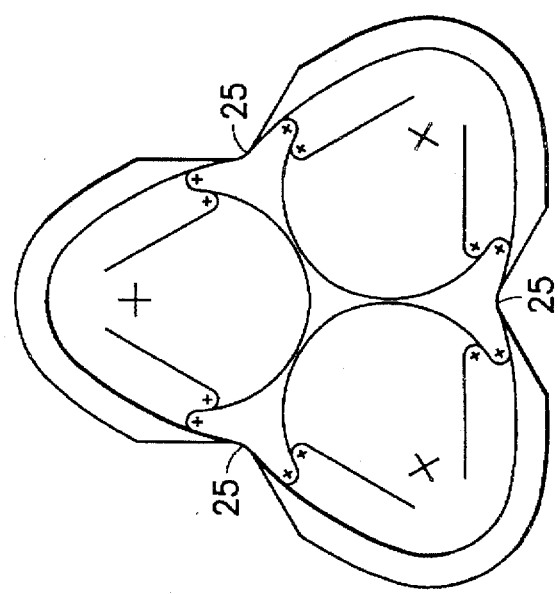

FIG. 3b shows these three arcuate body elements joined together by welds, 25, so as to form the elements into a unitary structure similar to that shown in FIG. 1 except for the provision of only a single pair of tongue members within each space defined by loop and angle of the triangular tubular body member and for the discontinuities in the terminal flanges around the ends of the tubular body member.

The individual packing elements that may be joined as indicated in FIG. 3b can be any of those that are well known in the art as well as obvious variations in such elements. These include the structures described in U.S. Pat. Nos. 4,303,599; 4,333,892; and 4,576,763.

Joinder of the elements can be achieved using a simple welding technique or by use of a separate connecting member attached to both by latching, welding, brazing or bolting techniques.

The packing elements according to the invention were compared to known commercial packing elements. The commercial elements were Hy-Pak® metal packing rings, Intalox® metal tower packing, and metal Pall rings, each of various sizes. Hy-Pak and Intalox are registered trademarks of Norton Company and all three types of packing element are available from Norton Chemical Process Products Corporation.

Figure 4:
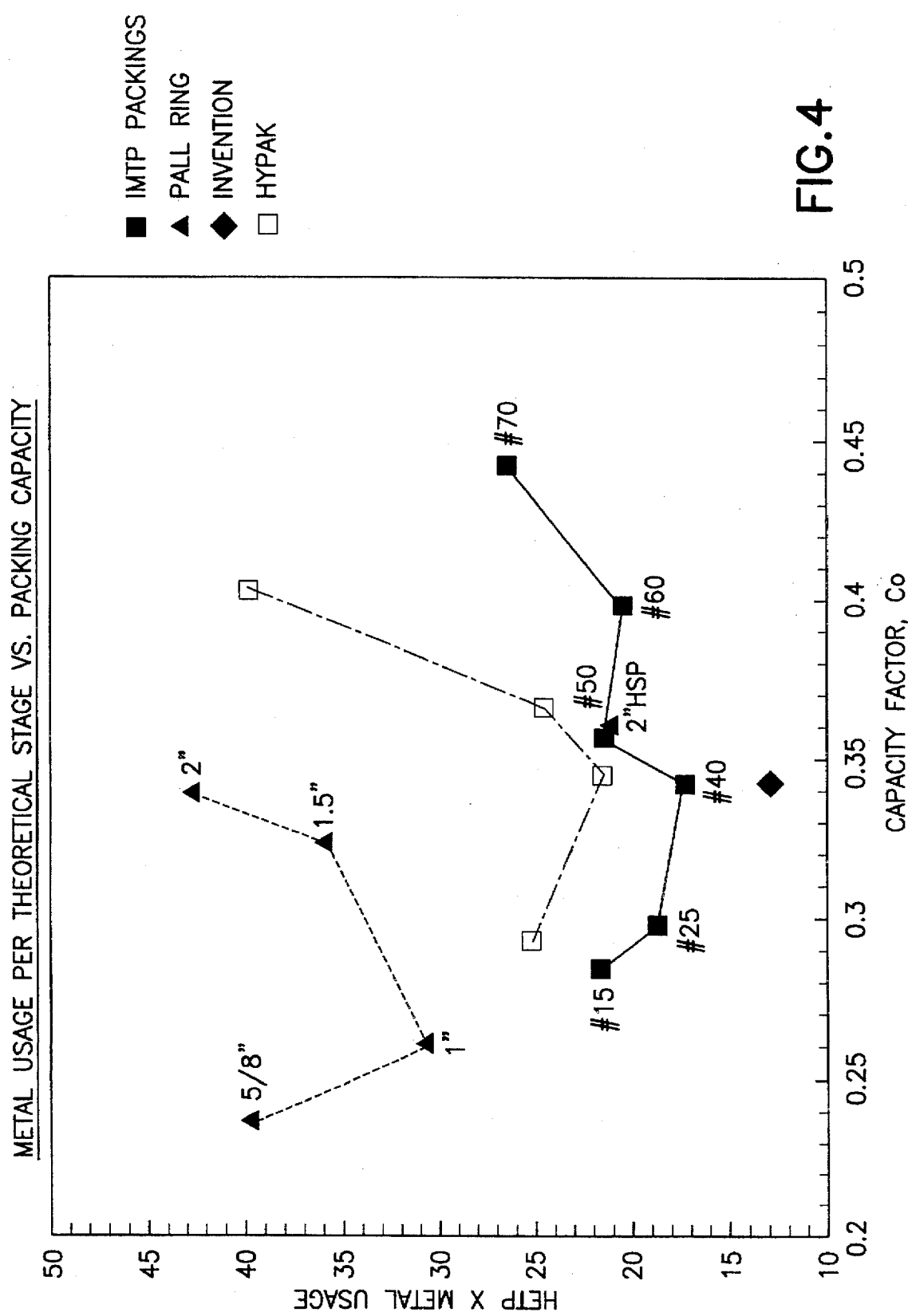
FIG. 4 is a graph in which the metal usage per theoretical stage is plotted against the capacity factor for four different packing elements: three prior art elements and the fourth according to the invention.
Figure 5:
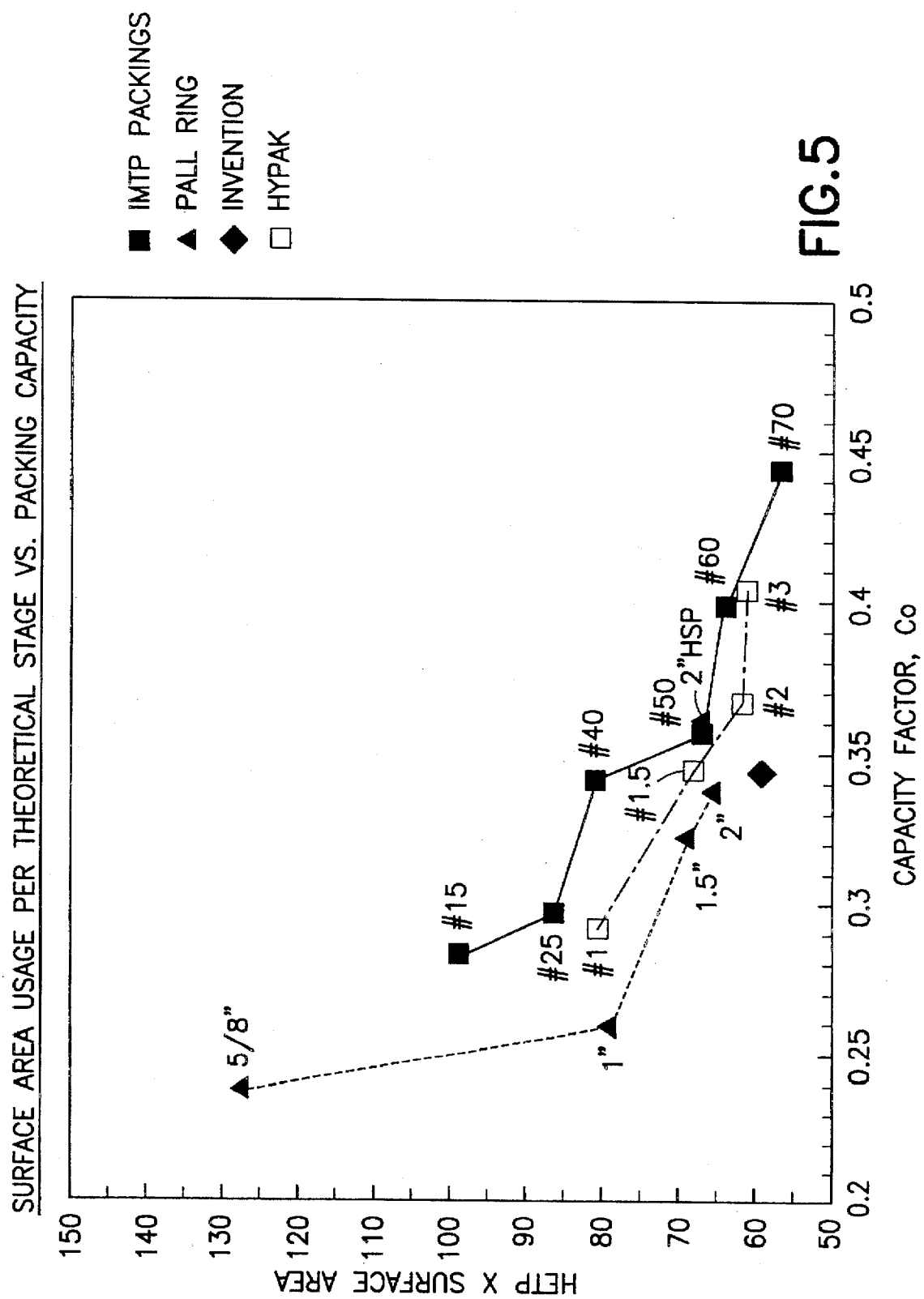
FIG. 5 is a graph of surface area usage per theoretical stage against capacity factor for the same four elements as were the subject of FIG. 4.

The graphs presented as FIGS. 4 and 5 show these three prior art packing elements in a variety of sizes and compares them to a sample of a metal packing according to the invention. This was made as illustrated in FIG. 3 by linking together three Intalox® metal tower packing units to form a device with a general trefoil structure.

The horizontal axis in both graphs is the capacity factor which is a measure of the throughput required to achieve a specified degree of separation in a given operation. It is therefore a measure of the capacity of a tower containing the elements. The higher the capacity factor, the better the performance of the element.

The vertical axis in FIG. 4, "HETP x Metal Usage" represents the metal usage per theoretical stage per unit tower cross-sectional area. A "theoretical stage" is the height of a tower theoretically required to achieve a specific degree of separation, (which is a constant for a given process). The vertical axis therefore plots the inverse of the efficiency with which the metal is used. Thus the lower the value plotted on the vertical axis, the better the performance of the packing. Thus in FIG. 4 the most desirable products are those found with low values on the vertical axis and high values on the horizontal axis. As can readily be seen, the packing according to the invention had the most efficient metal usage of all the products evaluated, implying that the weight of packing required to achieve a given separation is less than half that of the nearest of the prior art commercial packing materials. This has obvious consequences in terms of the costs of the elements and the design of towers to contain the packing elements and specifically the depth of packing before significant deformation of the lower levels of packing elements can be anticipated.

In FIG. 5, the vertical axis is the packing surface area required (per unit tower cross-sectional area), in order to generate one theoretical stage. Thus the lower the value on the vertical axis the more efficient is the packing element. The capacity factor plotted along the horizontal axis is the same as appears in FIG. 4 discussed above. Thus the best elements are again those that appear towards the right hand lower quadrant of the graph. Here certain of the prior art packings have better values but reference to FIG. 4 shows that this is achieved at the expense of much greater weight. This is a severe limitation on the design possibilities of a tower containing such packing elements.

What is claimed is:

1. A random dumped packing element having a peripheral body member in the general shape of an equilateral triangle having width and depth dimensions, measured from an apex to the nearest point on the opposed base and along the axis of the element respectively, wherein the width is greater than the depth, the space within the peripheral body member being occupied by a plurality of projections from the internal surfaces of the sides of the body member and comprising loops connecting each pair of adjacent sides so as to define passages within the element between each loop and the sides of the body member connected by the loop.

2. A packing element according to claim 1 in which the width is at least 1.5 times the depth.

3. A packing element according to claim 1 which is fabricated from a ceramic precursor or a plastic and in which the loops are connected by rib members.

4. A packing element according to claim 1 in which the element is formed from a metal.

5. A packing element according to claim 1 in which the loops are provided with tongue members projecting from the loops and into the space between the loops and the body member.

* * * * *